United States Patent [19]

Saunders et al.

[11] Patent Number: 5,363,146
[45] Date of Patent: Nov. 8, 1994

[54] MOTION COMPENSATED IMAGE PROCESSING

[75] Inventors: Nicholas I. Saunders, Basingstoke; Stephen M. Keating, Reading, both of United Kingdom

[73] Assignee: Sony United Kingdom Ltd., Staines

[21] Appl. No.: 18,416

[22] Filed: Feb. 17, 1993

[30] Foreign Application Priority Data

Mar. 2, 1992 [GB] United Kingdom ............... 9204504

[51] Int. Cl.⁵ .............................................. H04N 7/137
[52] U.S. Cl. .................................... 348/699; 348/443
[58] Field of Search ............... 358/105, 136; 348/443, 348/699; H04N 7/137

[56] References Cited

U.S. PATENT DOCUMENTS

| | | | |
|---|---|---|---|
| 4,862,267 | 8/1989 | Gillard et al. | 358/105 |
| 4,864,398 | 9/1989 | Avis et al. | 358/105 |
| 4,992,869 | 2/1991 | Samad et al. | 358/105 |
| 4,992,870 | 2/1991 | Samad | 358/105 |
| 5,005,077 | 4/1991 | Samad et al. | 358/105 |
| 5,025,495 | 6/1991 | Avis | 358/105 |

FOREIGN PATENT DOCUMENTS 2231749 11/1990 United Kingdom .
2231750 11/1990 United Kingdom .

Primary Examiner—Tommy P. Chin
Assistant Examiner—Richard Lee
Attorney, Agent, or Firm—William S. Frommer; Alvin Sinderbrand

[57] ABSTRACT

A motion compensation image processing apparatus and method for generating motion vectors that represent image motion between a pair of input images from which an output image is derived by motion compensated interpolation. A plurality of motion vectors are generated for each pixel of the output image and it is determined whether respective test blocks of each of the pair of input images, pointed to by each of the plurality of motion vectors, lie partially outside their respective input images. If one or both of the test blocks lies partially outside its respective input image, the degree of correlation between the test blocks is detected by performing a first correlation test on parts of the test blocks lying inside their respective input images. However, if both of the test blocks lie wholly inside their respective input image, the degree of correlation between the test blocks is detected by performing a second correlation test. The motion vector having the highest degree of correlation between the test blocks is selected for motion compensation interpolation.

10 Claims, 11 Drawing Sheets

| | INPUT FRAME 1 | INPUT FRAME 2 | MASK? | NORMALIZE |
|---|---|---|---|---|
| | C0 C1 C2 C3 C4 | C0 C1 C2 C3 C4 | R0 | 25/20 |

*Fig.4a*

| MASK? | NORMALIZE |
|---|---|
| R0, C4 | 25/16 |

*Fig.4b*

| MASK? | NORMALIZE |
|---|---|
| OUT OF RANGE | — |

*Fig.4c*

| MASK? | NORMALIZE |
|---|---|
| R0, R1 C4 | 25/12 |

*Fig.4d*

| MASK? | NORMALIZE |
|---|---|
| R0, R1 C3, C4 | 25/9 |

*Fig.4e*

MOTION COMPENSATED IMAGE PROCESSING

BACKGROUND OF THE INVENTION

1. Field Of the Invention

This invention relates to motion compensated image processing.

2. Description of the Prior Art

Motion compensated image processing is used in image processing applications such as television standards conversion, film standards conversion or video to film conversion. An example of a previously proposed motion compensated image processing apparatus is described in the British Published Patent Application number GB-A-2 231 749, in which pairs of temporally adjacent input images (fields or frames) of a digital video signal are processed to generate corresponding sets of motion vectors for use in motion compensated interpolation of an output image.

The set of motion vectors generated from a pair of input images comprises a plurality of motion vectors for each picture element (pixel) in the output image, albeit that each pixel may have the same plurality of motion vectors as other pixels in a block of the output image.

For each pixel in the output image, the set of motion vectors is supplied to a motion vector selector which tests the plurality of motion vectors corresponding to that pixel in order to select one motion vector for use in interpolation of that pixel. The selected motion vector for each pixel is supplied to a motion compensated interpolator which interpolates the output image from the pair of input images, taking into account the motion between the input images.

In some known motion compensated image processing systems each of the plurality of motion vectors corresponding to a particular output pixel to be tested by comparing test blocks of pixels in the two input images pointed to by that motion vector. In particular, the sum of the absolute luminance differences between corresponding pixels in the two blocks is detected, and the motion vector in the plurality for which this sum has the lowest value is selected for use in interpolation of the output pixel. However, if one or both of the test blocks falls partially outside its respective input image for a particular motion vector, then some of the pixels from which the sum of absolute luminance differences is calculated will be those outside the active picture area of the input frames. These could be pixels in the blanking area of the input frames or could simply be spurious data values generated because the addresses of those pixels were not valid. The result is that the sum of absolute differences calculated using those pixels cannot be used in the vector selection process, and in fact one previously proposed solution to this problem would be to assign the zero motion vector to the output pixel under these circumstances.

An alternative, unsatisfactory, solution would be to mask the outer regions of the output images to conceal errors in motion vector selection.

SUMMARY OF THE INVENTION

This invention provides a method of motion compensated image processing in which motion vectors are generated to represent image motion between a pair of input images from which an output; image is to be derived by motion compensated interpolation, said method comprising the steps of:

generating a plurality of motion vectors for each pixel of said output image;

testing each of said plurality of motion vectors associated with an output pixel in said output image by:

(i) determining whether respective test blocks of said pair of input images, pointed to by a motion vector under test, lie partially outside their respective input images;

(ii) if one or both of said test blocks lies partially outside its respective input image, detecting a degree of correlation between said test blocks by performing a first correlation test on parts of said test blocks lying inside their respective input images; and (iii) if both of said test blocks lie wholly inside their respective input images, detecting a degree of correlation between said test blocks by performing a second correlation test on said test blocks; and selecting, from said plurality of motion vectors, a motion vector having a highest degree of correlation between said test blocks pointed to by that motion vector.

The invention allows motion vector selection to be performed even when one or both of the test blocks pointed to by the motion vector under test lies partially outside its respective input image. A correlation test is performed to detect the degree of correlation between the test blocks using only those pixels in each nest block which lie inside the input images. This means that a motion vector need not be discarded in the selection process simply because part of a test block pointed to by that motion vector lies outside the input image.

It is preferred that the step of performing the second correlation test comprises the steps of: detecting the absolute luminance difference between pairs of pixels at corresponding positions in the test blocks; and summing the absolute luminance differences, thereby generating a sum of absolute differences (SAD) value.

In one preferred embodiment the step of performing the first correlation test comprises the steps of: detecting the absolute luminance difference between pairs of pixels at corresponding positions in the test blocks, for which both pixels in each pair lie inside their respective input images; and summing the absolute luminance differences, thereby generating a SAD value. Because this SAD value is generated from fewer pixels than SAD values generated from test blocks lying wholly within their input images, it is necessary to follow this test with the step of multiplying each SAD value obtained from the first correlation test by a scale factor dependent on the ratio of the number of pixels in each test block to the number of pairs of pixels used to calculate that SAD value. This normalising step allows SAD values generated by the first and second correlation tests to be compared on like terms.

Preferably the step of performing the first correlation test comprises the steps of: detecting the absolute luminance difference between pairs of pixels at corresponding positions in the test blocks; setting the detected absolute luminance difference to zero for those pairs of pixels in which one or both of the pair lies outside its respective input image; and summing the absolute luminance differences, thereby generating a SAD value. In this arrangement all of the difference values are calculated, whether or not the pixels used in the calculation lie outside their respective input images. After the calculation has been performed, unwanted values are masked or set to zero before the SAD value is summed.

In another preferred embodiment the step of performing the first correlation test comprises the steps of: for a test block which lies partially outside its respective input image, substituting pixels from that part of the test block inside the input image into pixel positions in the test block lying outside the input image; detecting the absolute luminance difference between pairs of pixels at corresponding positions in the test blocks; and summing the absolute luminance differences, thereby generating a SAD value. By substituting pixel data into pixel positions lying outside the input images a full correlation test between all of the pairs of pixels at corresponding positions in the two blocks can be performed, with no need for any subsequent normalisation.

Preferably the selecting step comprises discarding a motion vector if one or more pixels at predetermined positions in either or both of the test blocks lies outside its respective input image.

It is preferred that one of the plurality of motion vectors associated with each output pixel is a motion vector representing zero inter-image motion. This guarantees that, for each output pixel within the output image, at least one motion vector will not be discarded as described above.

Preferably the method also includes the step of interpolating each output pixel using the motion vector selected for that output pixel.

This invention also provides motion compensated image processing apparatus for generating motion vectors representing image motion between a pair of input images from which an output image is to be derived by motion compensated interpolation, said apparatus comprising:

means for generating a plurality of motion vectors for each pixel of said output image;

means for testing each of said plurality of motion vectors associated with an output pixel in said output image by:
(i) determining whether respective test blocks of said pair of input images, pointed to by a motion vector under test, lie partially outside their respective input images;
(ii) if one or both of said test blocks lies partially outside its respective input image, detecting a degree of correlation between said test blocks by performing a first correlation test on parts of said test blocks lying inside their respective input images; and
(iii) if both of said test blocks lie wholly inside their respective input images, detecting a degree of correlation between the test blocks by performing a second correlation test on said test blocks; and means for selecting, from said plurality of motion vectors, a motion vector having a highest degree of correlation between said test blocks pointed to by that motion vector.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 4 (a) to (e) show five examples illustrating the operation of a position detector and a masker;

DESCRIPTION OF THE PREFERRED EMBODIMENTS

Figure 1:
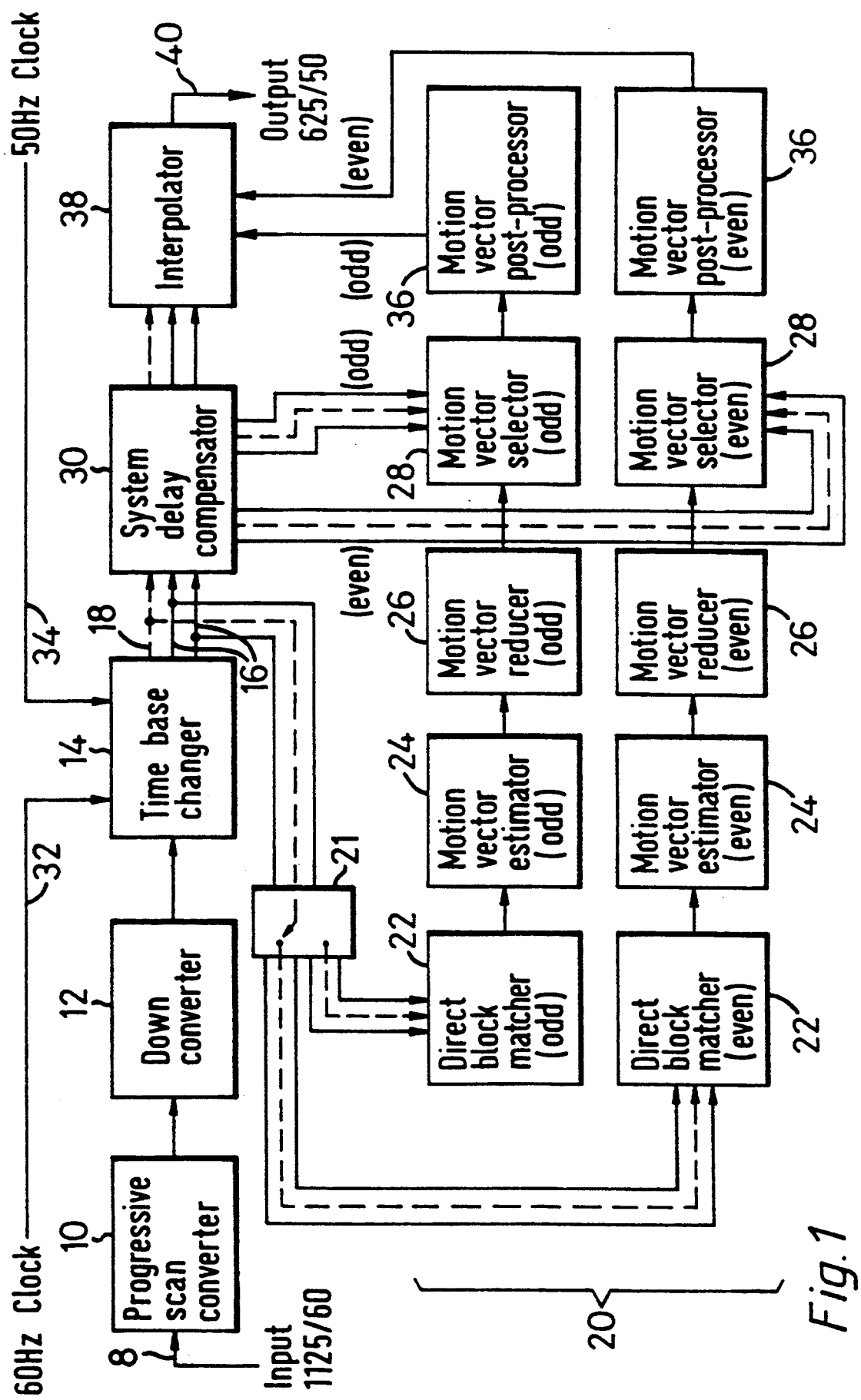
FIG. 1 is a schematic block diagram of a motion compensated television standards conversion apparatus.

Referring now to FIG. 1, a block diagram of a motion compensated television standards conversion apparatus for converting an input interlaced high definition video signal (HDVS) 8 having 1125 lines per frame and 60 fields per second into an output interlaced video signal 40 having 625 lines per frame and 50 fields per second is shown. The apparatus shown in FIG. 1 is based upon that disclosed in the British Published Patent Application number GB-A-2 231 749. The input video signal 8 is first supplied to a progressive scan converter 10 in which the input video fields are converted into video frames at the same rate (60 Hz) as the input video fields. These frames are then supplied to a down converter 12 which reduces the number of lines in each of the frames to 625, the number of lines in a frame of the output video signal 40. The down-converted input frames are then passed to a time base changer 14 which also receives as inputs a 60 Hz clocking signal 32 locked to the field frequency of the input video signal 8 and a 50 Hz clocking signal 34 locked to the required field frequency of the output video signal 40. The time base changer 14 determines the temporal position of each field of the output video signal and selects two of the down-converted frames of the input video signal 8 to be used in interpolating that field of the output video signal. The two down-converted input frames selected by the time base changer are supplied on respective outputs 16, with a third output 18 of the time base changer carrying control information.

The video signals corresponding to the two down-converted input frames selected by the time base changer 14 are supplied as inputs to a motion processor 20. The motion processor comprises two substantially identical processing sections: one for even output fields and one for odd output fields. The two down-converted input frames selected by the time base changer 14 are routed to the even field or the odd field processing section as appropriate by means of a switch 21 under the control of a signal (not shown) derived from the 50 Hz clocking signal 34.

In the appropriate section (odd or even) of the motion processor 20, the down-converted input frames are supplied first to a direct block matcher 22 which calculates correlation surfaces representing the spatial correlation between blocks of the two frames. These correlation surfaces are passed to a motion vector estimator 24 which processes the correlation surfaces to generate a set of motion vectors which are supplied to a motion vector reducer 26. The motion vector estimator also performs a confidence test on each generated motion vector to establish whether that motion vector is significant above the general noise level, and associates a confidence flag with each motion vector indicative of the result of the confidence test. The confidence test itself comprises a 'threshold test' and a 'rings test' and is described in more detail in the above-mentioned British Published Patent Application.

The motion vector reducer 26 operates to reduce the choice of possible motion vectors for each pixel in each block, before the motion vectors are supplied to a motion vector selector 28. As part of its function the motion vector reducer 26 counts the frequencies of occurrence of the 'good' motion vectors (i.e. motion vectors which passed the confidence test), with no account taken of the position of the blocks of the input frames used to obtain those motion vectors. The good motion vectors are then ranked in order of decreasing frequency. The three most common of the good motion vectors which are significantly different to one another are then classed as 'global' motion vectors.

Three motion vectors which passed the confidence test are assigned to each block of pixels in the output field by the motion vector reducer 26 and are supplied, with the zero motion vector, to the motion vector selector 28 for further processing. These three selected motion vectors are selected in a predetermined order of preference from the motion vector generated from that block, those generated from the surrounding blocks, and finally the global motion vectors.

The motion vector selector 28 also receives as inputs the two down-converted input frames selected by the time base changer 14 and which were used to calculate the motion vectors (suitably delayed by a system delay compensator 30) and supplies an output comprising one motion vector per pixel of the output field. This motion vector is selected from the four motion vectors for that block supplied by the motion vector reducer 26. Any irregularity in the selection of the motion vectors by the motion vector selector 28 is removed by a motion vector post processor 36, from which the processed motion vectors are supplied to and control an interpolator 38 which also receives the appropriate odd or even pair of down-converted input frames selected by the time base changer, again suitably delayed by the system delay compensator 30. Using the motion vectors, the interpolator 38 interpolates an output field from the two down-converted input frames selected by the time base changer, taking into account any image motion between the two frames. The two down-converted input frames are combined in relative proportions depending on the temporal position of the output field with respect to the two frames, so that a larger proportion of the nearer input frame is used. The output 40 of the interpolator 38 is an interlaced video signal having 625 lines per frame and 50 fields per second.

The motion vector selector 28 selects one motion vector for each pixel in the output field from the four motion vectors assigned to a block containing that pixel by the motion vector reducer. To achieve this the motion vector selector 28 tests each of the four motion vectors associated with each output pixel in order to determine which of these four motion vectors is the closest approximation to the image motion at that output pixel. The way in which this test is performed is shown schematically in FIG. 2.

Figure 2:
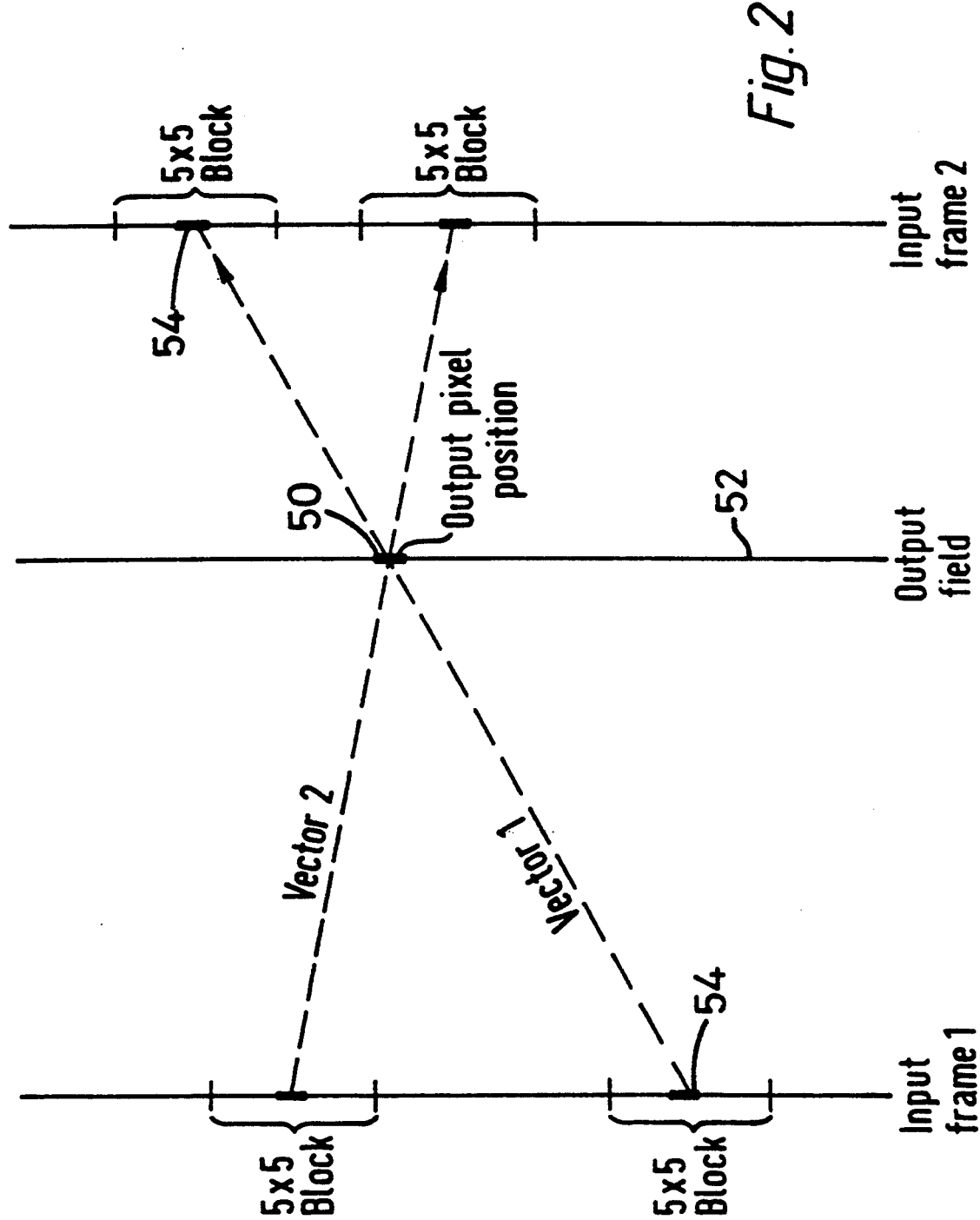
FIG. 2 is a schematic illustration showing the operation of a motion vector selector.

FIG. 2 shows two of the motion vectors (vector 1 and vector 2) associated with an output pixel 50 in an output field 52. For clarity of the Figure, the other two motion vectors (one of which is the zero motion vector) associated with the output pixel 50 have not been shown. In order to test one of the motion vectors (e.g. vector 1) associated with the output pixel 50, that vector is extrapolated to point to respective pixels 54 in the input frames from which the output field 52 is to be interpolated. The degree of correlation between respective blocks of pixels surrounding the pixels 54 in the input frames is then calculated.

When the blocks of pixels surrounding the pixels 54 pointed to by the motion vector under test lie within their respective input frames, the degree of correlation between the blocks is calculated by calculating the absolute luminance difference between pairs of pixels at corresponding positions in the two blocks. These absolute luminance difference values are then added to produce a sum of absolute luminance differences ('SAD') associated with the motion vector under test. A high SAD value indicates a low degree of correlation between the blocks in the input frames surrounding the pixels pointed to by that motion vector, and a low SAD value indicates a high degree of correlation between those blocks. This test is performed for each of the four motion vectors supplied to the motion vector selector 28 by the motion vector reducer 26; the motion vector having the lowest SAD value from the test is selected by the motion vector selector 28 for use in interpolation of the output pixel 50.

If both of the pixels 54 lie inside their respective input frames but one or more rows of the test blocks lie outside the input frames a SAD value generated in the manner described above will not be a valid indication of the degree of correlation between the areas pointed to by the motion vector under test. This is because some of the pixels used to generate the SAD value will be those outside the active picture area of the input frames. These could be pixels in the blanking area of the input frames or could simply be spurious values generated because the addresses of those pixels were not valid. One solution to this problem (as used in the previously proposed image processing apparatus mentioned earlier) would be to assign the zero motion vector to the output pixel under these circumstances. However, more satisfactory solutions are used in the embodiments to be described below.

Figure 3:
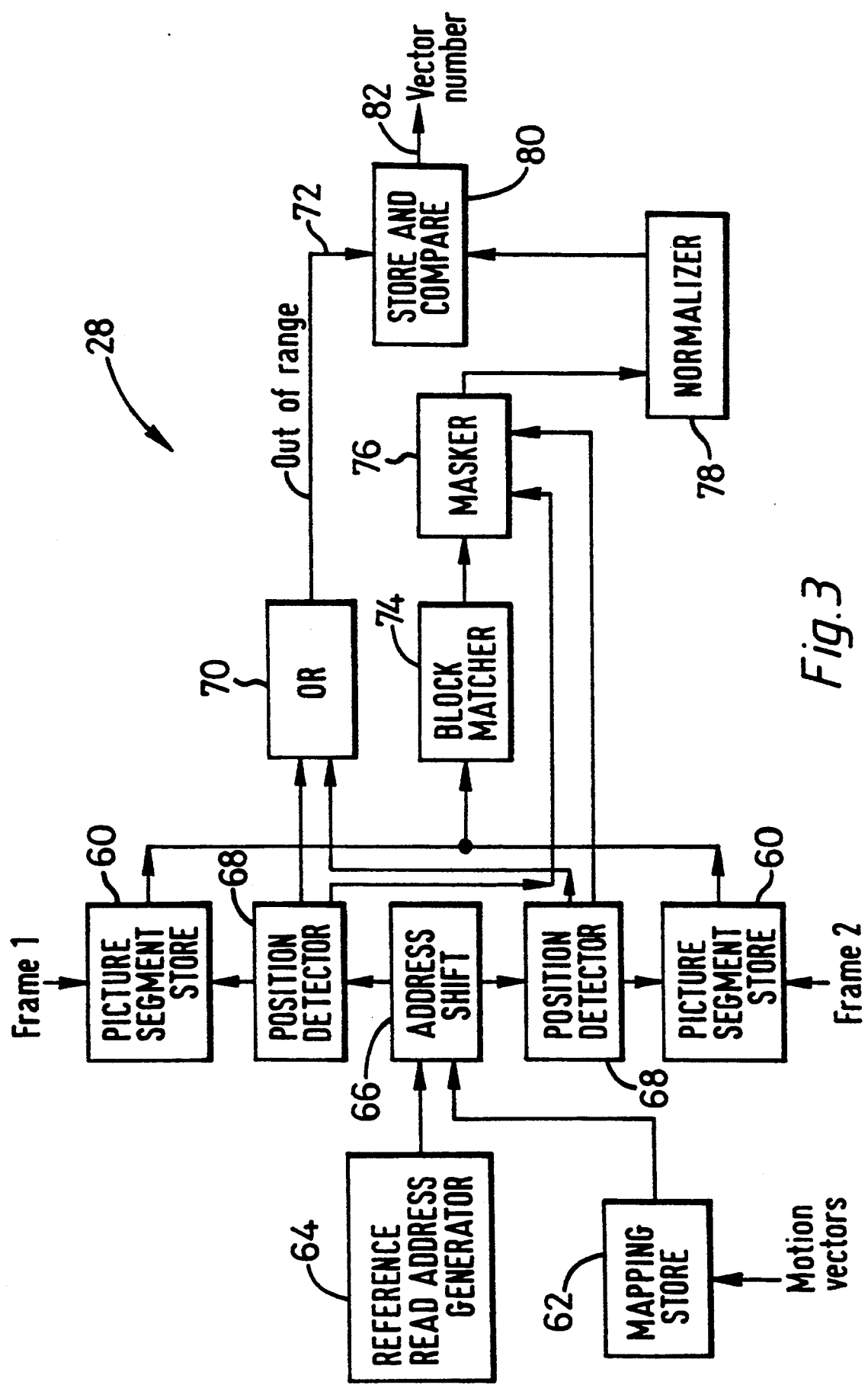
FIG. 3 is a schematic block diagram of one embodiment of a motion vector selector.

FIG. 3 shows one embodiment of a motion vector selector 28. The motion vector selector 28 receives as inputs at least a relevant portion of each of the two input frames from which the current output field is to be interpolated. These portions are stored in respective picture segment stores 60. The motion vector selector 28 also receives the sets of motion vectors associated with each block of pixels in the output field; these are stored in a mapping store 62.

In operation, a reference read address generator 64 generates the address of each pixel in the output field in turn. This address, along with the four motion vectors assigned to the block of the output field containing that pixel, is supplied to an address shifter 66 which, for each of the four motion vectors in turn, calculates the pixel address of the pixel pointed to by that motion vector in each of the two input frames. This pixel address is passed to a respective position detector 68 for each of the input frames.

Each position detector 68 detects whether the address of the pixel pointed to by the motion vector under test lies outside the respective input frame or so close to the edge of that input frame that a block of pixels surrounding that pixel would fall partially outside the input frame. If the position detector determines that the pixel pointed to by the motion vector under test lies outside its input frame it sends an "out of range" signal to an OR-gate 70. The OR-gate receives out of range signals from both position detectors 68 and performs a logical OR operation so that if either of the pixels pointed to by the motion vector under test is outside its respective input frame an out of range signal 72 is generated. If, however, the position detectors detect that the pixel pointed to by the motion vector under test is not outside its respective input frame but is so close to the edge of that input frame that a test block of pixels surrounding that pixel would fall partially outside the input frame, the position detector generates one or more masking signals which will be described further below.

The pixel address generated by the address shifter 66 is then passed from the position detector 68 to the respective picture segment store 60, which supplies as an output a block of 5×5 pixels centred on the pixel pointed to by the motion vector under test. In this embodiment these blocks are supplied in full whether or not one or more rows or columns of pixels in the blocks lay outside the respective input image. The two blocks of pixels from the respective picture segment stores 60 are supplied to a block marcher 74 for further processing. In the block marcher 74 the luminance values of pixels at corresponding positions in the two blocks of pixels are compared and an array of absolute difference values, one value for each pixel position in the block, is generated and passed to a masker 76.

The masker 76 operates selectively to set one or more rows and/or one or more columns of values in the array of absolute difference values to zero. The selection of which rows and which columns to set to zero is made by the position detectors 68 so that any row or column of absolute difference values generated from pixels lying outside one or both of the input frames is set to zero. After the rows and columns have been selective masked, the twenty five absolute difference values (some of which may have been set to zero) are summed to produce the SAD value which is passed to a normaliser 78.

The normaliser 78 is necessary so that the SAD values generated for the four different motion vectors corresponding to the current output pixel can be compared on like terms. The normaliser 78 operates by determining how many pixel positions in the array of absolute differences passed to the masker 76 have been set to zero and effectively multiplies the SAD value output by the masker 76 by a normalisation factor equal to:

$$\frac{\text{number of pixels in each test block}}{\text{number of pixels not set to zero by the masker 76}}$$

After normalisation the normalised SAD value is passed to a store and compare unit 80 which also receives the combined out of range signal 72 generated by the OR gate 70. When the first of the four possible motion vectors is tested for a particular output pixel, the store and compare unit 80 simply stores the normalised SAD value associated with that vector, along with a vector number identifying that vector. When subsequent ones of the four motion vectors are tested, the normalised SAD value passed to the store and compare unit is compared with the SAD value already stored therein and the higher of the two values being compared is discarded. The vector number corresponding to the SAD value not discarded at each stage of operation is stored along with that SAD value.

If an out of range signal 72 is received by the store and compare unit 80 corresponding to any of the motion vectors under test, that motion vector is automatically discarded in the store and compare unit 80. In this regard it should be noted that because one of the four motion vectors which are tested for each output pixel is the zero motion vector, there will always be at least one tested motion vector which does not result in an out of range signal 72.

The comparing and discarding process performed by the store and compare unit 80 means that by the time the fourth motion vector has been tested, the motion vector number held in the store and compare unit corresponds to that motion vector for which the normalised SAD value generated from blocks of the input frames pointed to by that motion vector is the lowest, thereby indicating the highest degree of correlation between those blocks. At the end of the testing process the vector number appropriate to the output pixel is supplied on an output 82 by the store and compare unit 80.

FIG. 4 illustrates five examples (a) to (e) showing the operation of the position detector 68, the masker 76 and the normaliser 78. In each of the examples the blocks of 5×5 pixels centred on the pixel pointed to by the motion vector under test are shown for each of the input frames (input frame 1 and input frame 2). The actual pixel pointed to by the motion vector under test is indicated by an "X" in the central position of the blocks, and the border of the respective input frame is shown by a bold line through the blocks. The blocks are arranged as five rows, designated $R_0$ to $R_4$, and five columns, designated $C_0$ to $C_4$. Pixels in the blocks falling outside the respective input frame are shown in broken line.

In the first example, example (a) shown in FIG. 4, the top row, $R_0$, in each of the test blocks falls outside its respective input frame. This is detected by the position detectors 68 which instruct the masker 76 to set all of the absolute difference values calculated using pixels in the row $R_0$ to zero. However 20 usable absolute difference values have been calculated, using pairs of pixels at the positions ($C_0$, $R_1$) through to ($C_4$, $R_4$). Accordingly the sum of these 20 absolute difference values is normalised by multiplying the sum by 25/20.

In the second example, example (b), all of the pixels in the test block in the input frame 1 lie within that input frame, but the test block in the input frame 2 overlaps a corner of that input frame so that one row ($R_0$) and one column ($C_4$) of that test block lie outside the input frame 2. The position detector 68 for the input frame 1 does not generate any masking signals but the position detector 68 for the input frame 2 generates signals indicating that the row $R_0$ and the column $C_4$ should be masked. After this masking has been performed by the masker 76, 16 out of the possible 25 pairs of pixels in the test blocks have been used to generate an SAD value, so a normalisation factor of 25/16 is applied.

In the example (c) the actual pixel in the input frame 1 pointed to by the motion vector under test lies outside that input frame. An out of range signal is generated by the position detector for the input frame 1 resulting in an out of range signal 72 at the output of the OR-gate 70. This means that the SAD value generated for that motion vector is automatically discarded by the store and compare unit 80 as described above, so any normalisation is irrelevant.

In the example (d) the test block in the input frame 1 as one row ($R_0$) and one column ($C_4$) of pixels lying outside the input frame, and the test block in the input frame 2 has two rows ($R_0$ and $R_4$) of pixels lying outside that input frame. As described above, the masker 76 operates to mask a row or a column of pixels which lies outside either or both of the test blocks, so masking is applied to the rows $R_0$ and $R_1$ and to the column $C_4$. This masking leaves 12 pixel positions used to generate the SAD value for that motion vector, so a normalisation factor of 25/12 is applied by the normaliser 78.

Finally, the example (e) shows an extreme case of masking in which two rows ($R_0$ and $R_1$) and two columns ($C_3$ and $C_4$) of pixel positions are masked by the masker 76. This leaves 9 pixel positions used to generate the SAD value so the normalisation factor in this case is 25/9.

Figure 5:
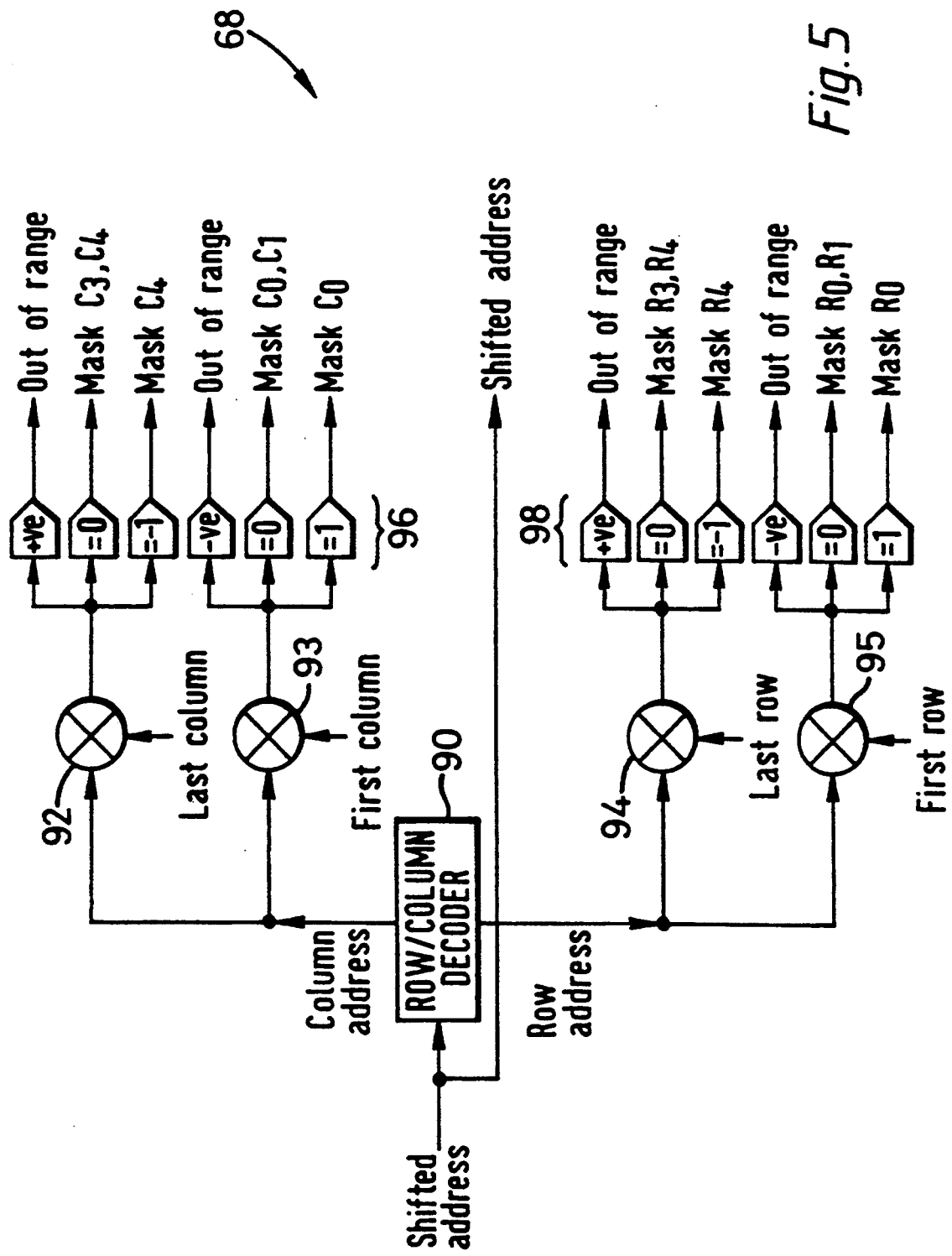
FIG. 5 is a schematic block diagram of a position detector.

FIG. 5 is a schematic diagram showing the operation of one of the position detectors 68. The position detector 68 receives a shifted address from the address shifter 66 as an input and supplies a number of outputs, namely: out of range signals (to the OR-gate 70); masking signals (to the masker 76); and the (unchanged) shifted address (to the respective picture segment store 60).

The shifted address input to the position detector 68 is supplied first to a row/column decoder 90 which separates the row address from the column address of the pixel in question (if the shifted address supplied by the address shifter 66 is in a format in which the row and column portions are already separate the row/column decoder will not be necessary). The column address is supplied to two subtractors 92 and 93, one of which (the subtracter 93) subtracts from the column address a value equal to the column address of the first column in the input frame and the other of which (the subtracter 92) subtracts from the column address a value equal to the column address of the last column in the input frame. The respective outputs of the subtractors 92 and 93 are supplied to a number of comparators 96. In particular, the tests performed on the output of the subtracter 92 (in which the address of the last column in the input frame is subtracted from the column address of the current pixel) are as follows:

If the value is positive then the column address of the current pixel is greater than the address of the last column in the input frame, so an a "out of range" signal is generated;

If the value is zero then the current pixel is in the last column of the input frame, so the two right hand columns ($C_3$ and $C_4$) of the test block will lie outside the input frame and should be masked; and If the value is equal to $-1$ then the current pixel is in the penultimate column of the input frame so the extreme right hand column ($C_4$) of the test block should be masked.

Similarly, the output value generated by the subtracter 93 (in which the address of the first column of the input frame is subtracted from the column address of the current pixel) is tested as follows:

If the value is negative then the shifted address lies outside the input frame so an out of range signal is generated;

If the value is zero then the current pixel lies in the first column of the input frame; this means that the two left hand columns of the test block lie outside the input frame and should be masked; and If the value is equal to 1 then the current pixel lies in the second column of the input frame; this means that the extreme left hand column of the test block ($C_0$) lies outside the input frame and should be masked.

Similar tests are applied to the row address by the subtractors 94 and 95. These tests are summarised below:

| | | |
|---|---|---|
| (Row address minus last row address) = | positive | - out of range |
| | zero | - mask $R_3$ and $R_4$ |
| | $-1$ | - mask $R_4$ |
| (Row address minus first row address) = | negative | - out of range |
| | zero | - mask $R_0$ and $R_1$ |
| | 1 | - mask $R_0$ |

Figure 6:
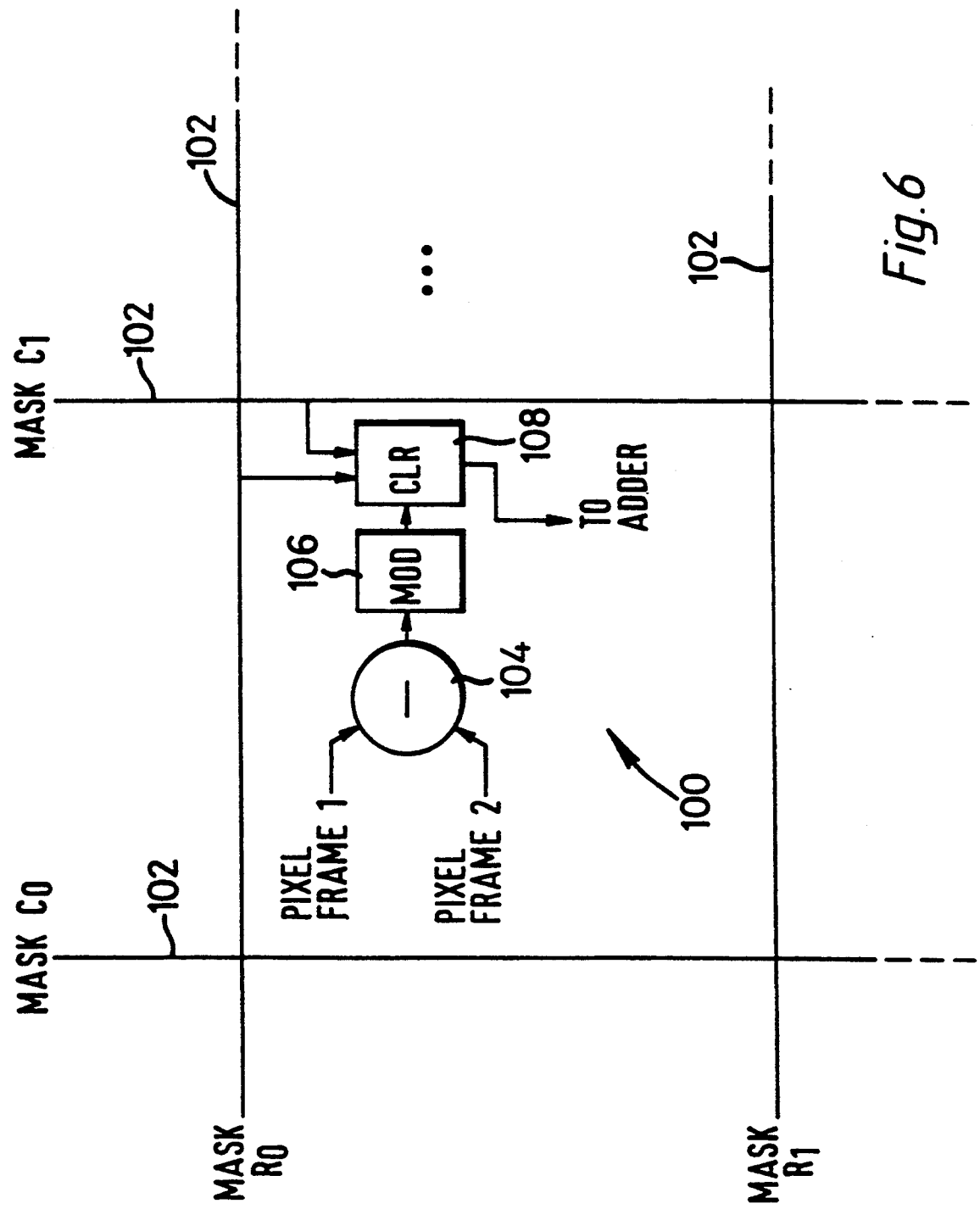
FIG. 6 is a schematic diagram of a part of a block marcher and masker.

FIG. 6 is a schematic diagram illustrating the operation of the block matcher 74 and the masker 76. The apparatus shown in FIG. 6 comprises 25 individual elements 100, each of which receives the luminance values of pixels at corresponding positions in the input frame 1 and the input frame 2 and supplies an output to an adder (not shown) which sums all of the outputs presented by the 25 elements 100. Masking signals from the position detectors 68 are supplied to respective supply lines 102 each of which is responsive to a logical OR combination of the masking signals from the two position detectors 68. In other words, if either or both of the position detectors 68 indicates that a particular row or column should be masked, a masking signal is carried on that row or column's supply line 102.

Each of the individual elements 100 includes a subtracter 104 which receives the luminance values for the pixels at corresponding positions in the input frame 1 and the input frame 2. The output of the subtracter 104 is supplied to a modulus generator 106 which supplies an output equal to the positive magnitude of the output of the subtracter 104. The output of the modulus generator 106, which equals the absolute value of the luminance difference between the two pixels supplied to the subtracter 104, is then supplied to a clearer 108 which is responsive to the masking signals on the supply lines corresponding to the row and column position of the pixels supplied to that element 100, and operates to set the output sent to the adder to zero if either or both of the masking signals are set to indicate that the corresponding row or column should be masked.

Figure 7:
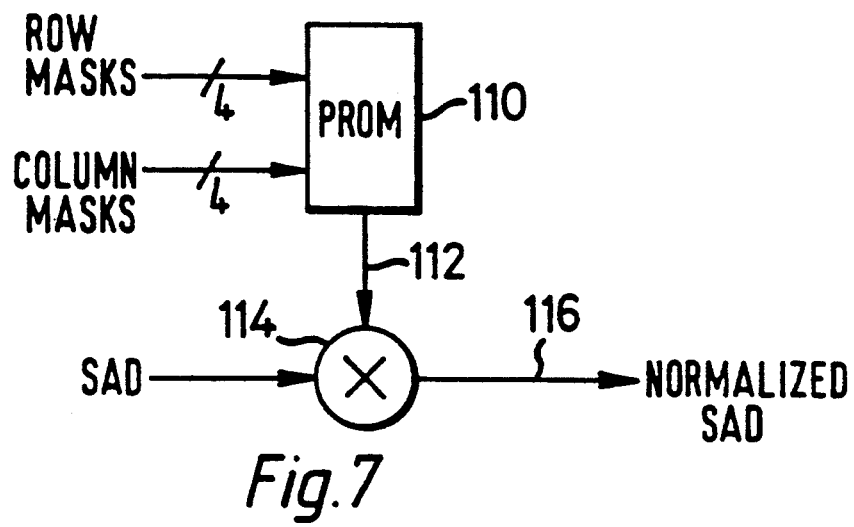
FIGS. 7, 8 and 9 are schematic illustrations off three embodiments of a normaliser.
Figure 8:
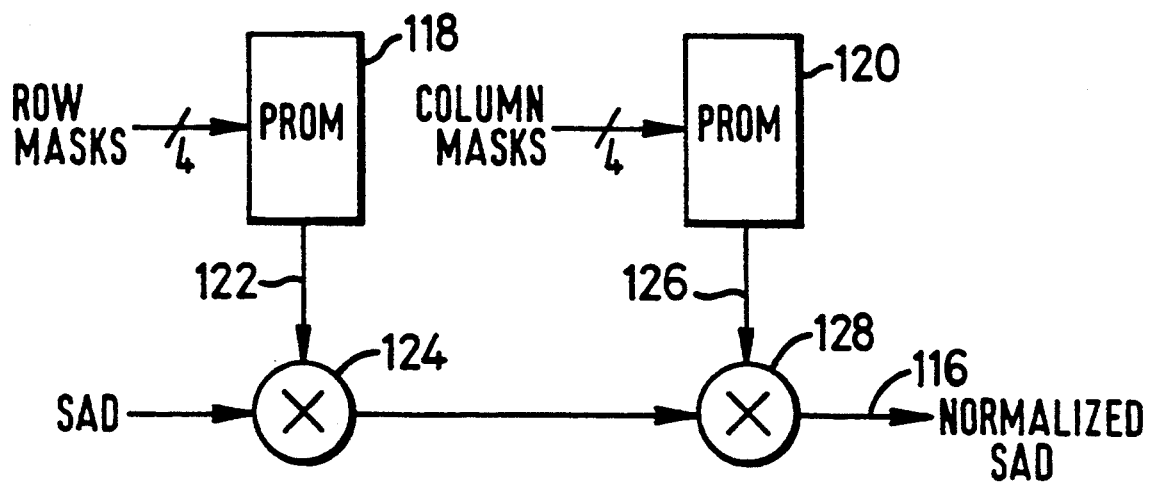
Figure 9:
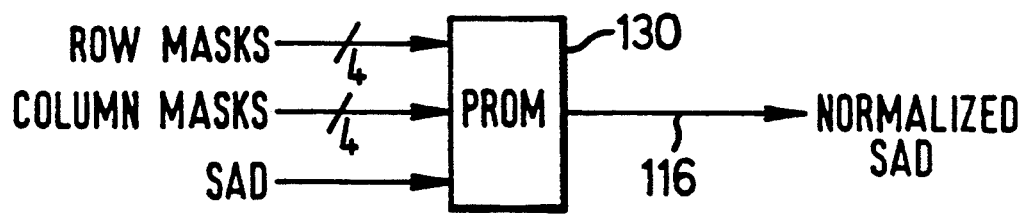

FIGS. 7, 8 and 9 are schematic illustrations of three embodiments of the normalised 78. In FIG. 7 the masking signals supplied from the position detectors 68 are used as inputs to a programmable read only memory (PROM) 110. These address inputs indicate whether the rows $R_0$, $R_1$, $R_3$ and/or $R_4$ have been masked and whether the columns $C_0$, $C_1$, $C_3$ and/or $C_4$ have been masked by the masker 76. The row $R_2$ and the column $C_2$ are never masked because if that row or that column lay outside the respective input frame an "out of range" signal would be generated. For each combination of column masking signals and row masking signals the PROM 110 supplies a data output 112 representing the normalisation factor to be applied to the SAD value output by the masker. The data output 112 is supplied to a multiplier 114 where the SAD is multiplied by the appropriate scaling factor to produce a normalised SAD at an output 116.

A second, similar, embodiment of the normaliser 78 is shown in FIG. 8, in which two PROMs 118 and 120 are used. The PROM receives the row masking signals as address inputs and supplies a data output 122 representing a normalisation factor for normalising in the row direction which is then applied to the SAD by a multiplier 124, and the PROM 120 receives the column masking signals as address inputs and generates a data output 126 which is then applied to the SAD by a multiplier 128 to produce a normalised SAD on an output 116.

It is straightforward to demonstrate that the row and column normalisation can be performed sequentially as shown in FIG. 8. For example, if one row and one column of pixels were masked, this would mean that the SAD value was calculated from 16 pixel positions and a normalisation factor of 25/16 would be required. Because 4 out of 5 rows had been used, a normalisation factor of 5/4 would be applied by the multiplier 124. Similarly, because 4 out of 5 columns had been used, a normalisation factor of 5/4 would be applied by the multiplier 128. These two multipliers operate in series, so the overall normalisation factor applied would be 5/4×5/4=25/16 as required.

A further embodiment of the normaliser 78 is shown in FIG. 9, in which the row masking signals, the column masking signals and the SAD are all applied to a single PROM 130 as address inputs. For each combination of the row masking signals, the column masking signals and the SAD, the PROM 130 produces a normalised SAD value on a data output 116.

The embodiments described so far have all involved masking those absolute luminance difference values derived from pixels lying outside the respective input frame. The embodiments to be described below apply the same fundamental idea, namely that the absolute difference values used to generate a sum of absolute luminance differences representing the correlation between the test blocks pointed to by a motion vector under test are generated using only those pixels lying inside the respective input frame. However, in the embodiments described below with reference to FIGS. 10 to 13, this basic idea is applied in a slightly different way, in that pixels in a test block lying inside the respective input frame are re-used in order to replace the pixels in that test block lying outside the input frame. Assuming that the actual pixel pointed to by the motion vector under test lies inside the input frame, the block matching process can then proceed as normal.

Figure 10:
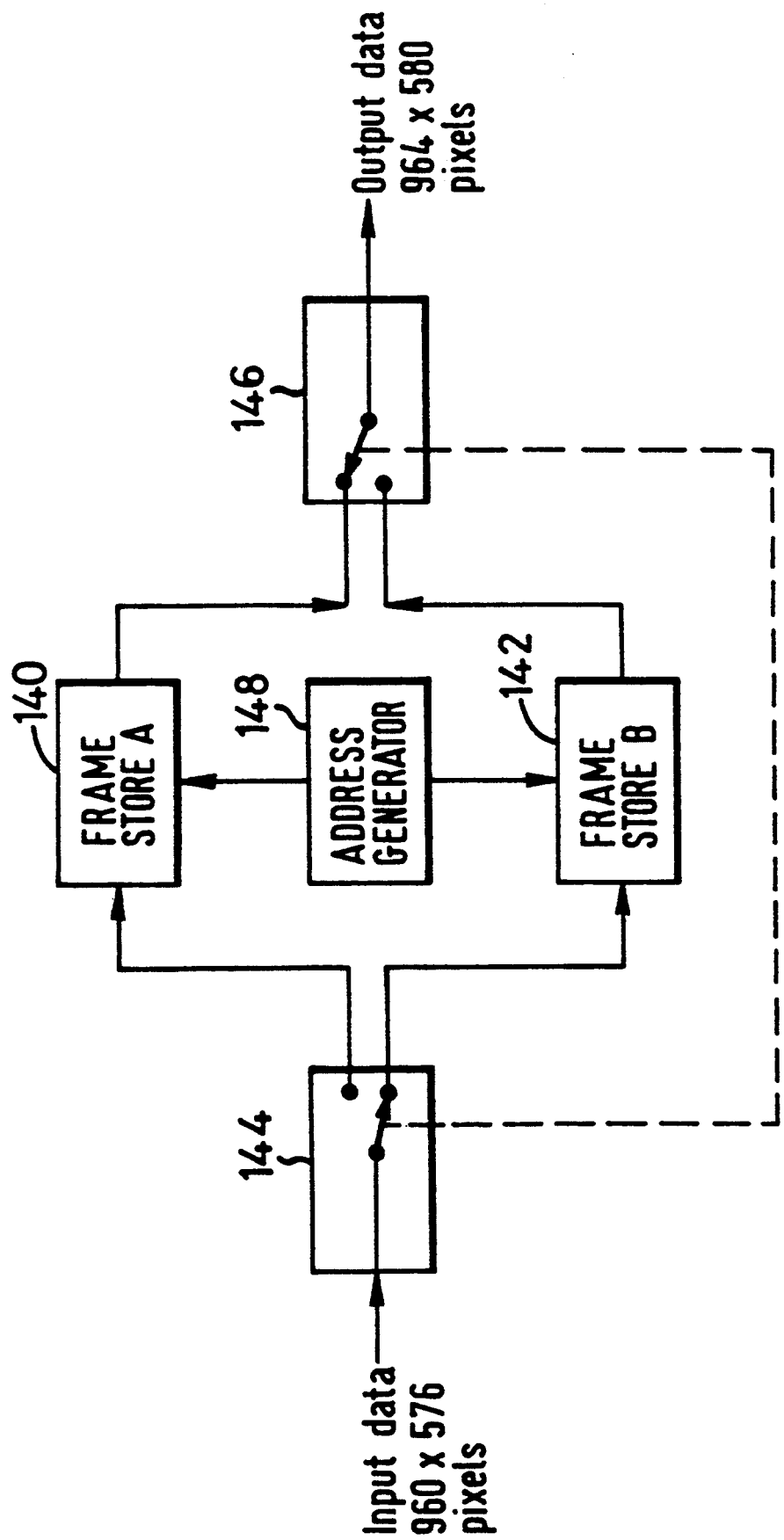
FIG. 10 shows a modification to the apparatus of FIG. 1 in which pixels normally lying outside an input frame are substituted by pixels from inside the frame.

FIG. 10 shows a modification to the apparatus of FIG. 1 which allows pixels normally lying outside an input frame to be replaced by pixels from inside the input frame. The effect of the apparatus in FIG. 10 is shown schematically in FIG. 11.

The apparatus in FIG. 10 is suitable for insertion into the apparatus of FIG. 1 in a position (e.g. in the time base changer 14) so that it operates on the input frame data before that data is supplied to the motion vector selector 28. The apparatus comprises a pair of frame stores (frame store A 140 and frame store B 142), an input switch 144 controlling which of the frame stores input data is written into, an output switch 146 controlling which of the frame stores output data is read from, and an address generator 148 controlling the address to which input data is written and from which output data is read in each of the frame stores. The input switch 144 and the output switch 146 are linked so that input data is written into the frame store A 140 at the same time as output data is read from the frame store B 142 and vice versa. Each of the frame stores 140 and 142 is large enough to hold a frame of (in this embodiment) 960×576 pixels. For each input frame the input data is written into the frame store selected by the input switch 144 under the control of the address generator 148 and fills that frame store.

Figure 11:
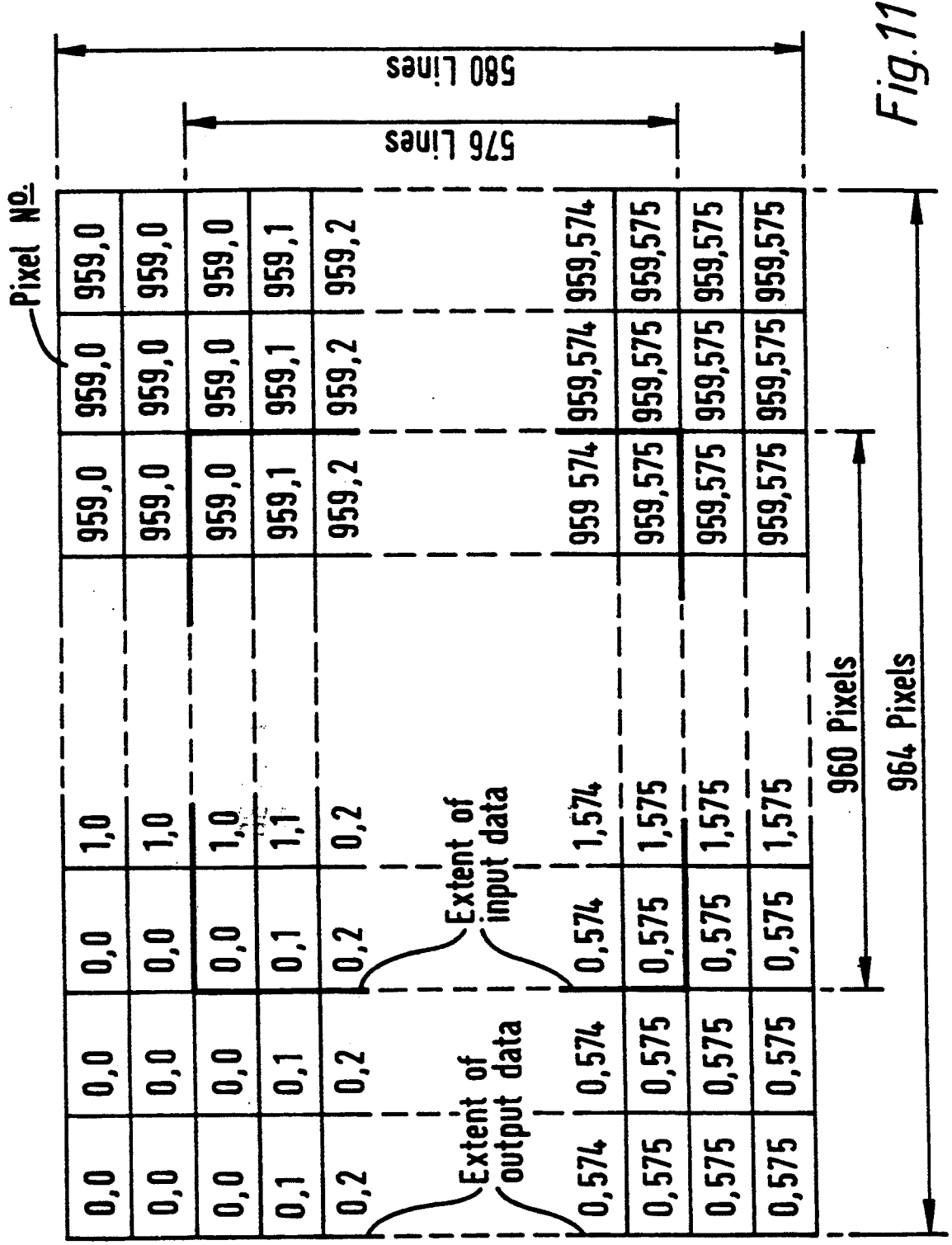
FIG. 11 shows the effect of the apparatus of FIG. 10 on an input image.

While input data is being written into one of the frame stores, say the frame store A 140, output data is read from the other of the frame stores (in this case, the frame store B 142) under the control of the address generator 148. The output data comprises 964×580 pixels, which represents an extra two pixels at the beginning and end of each row and of each column. These extra pixels are simply duplicates of nearby pixels on the extreme outer edge of the input frame. This can be seen with reference to FIG. 11 which shows the extent of the input data supplied to the apparatus of FIG. 10 and the extent of the output data produced by the apparatus at FIG. 10. The first two rows of pixels in FIG. 11 are simply duplicates of the top row of pixels in the input data. Similarly, the first two columns of pixels in the output data shown in FIG. 11 are duplicates of the first column of pixels in the input data. In this way output data comprising more rows and more columns of pixels than the input data can be generated by duplicating pixels of the input data. This duplication is controlled by the address generator 148 so that for example, when the first row of pixels in the output data is being read (the very top row of the output data in FIG. 11) the address generator addresses the top left pixel of the input data (pixel 0,0 in FIG. 11) three times and then continues along the top row of the input data, reading each pixel once, until the top right pixel (number 959, 0) which is repeated three times. This sequence of addresses is actually generated three times since the first three rows of the output data in FIG. 11 are identical. Thereafter, the address generator addresses the left-most pixel in a particular row three times, then continues along the row, reading each pixel once, until the right-most pixel which it again addresses three times. The effect of the apparatus shown in FIG. 10 is to generate input frames which are in fact larger than the required output fields, so that a test block of 5×5 pixels whose centre is within the (unenlarged) input frames will not lie outside the (enlarged) input frames.

In an alternative mode of operation of the apparatus of FIG. 10, the (unenlarged) input frames are expanded by n pixels in the horizontal and vertical directions by repeating, once, each of the n outermost pixels of the unenlarged input frames. In this case, example, the third column of FIG. 11 (representing the left-most column of the unenlarged input frame) would appear as follows:

| |
|---|
| 0,0 |
| 0,1 |
| 0,0 |
| 0,1 |
| 0,2 |
| 0,573 |
| 0,574 |

-continued

```
0,575
0,574
0,575
```

In either mode of operation of the apparatus of FIG. 10, the expansion of the input frame may be performed horizontally, vertically, or both horizontally and vertically. In the present embodiments, the input frame is expanded by n pixels in each selected direction, where n is equal to the integer value of one half of the test block size in that direction. For example, for a 5×5 pixel test block, n is equal to 2.

Figure 12:
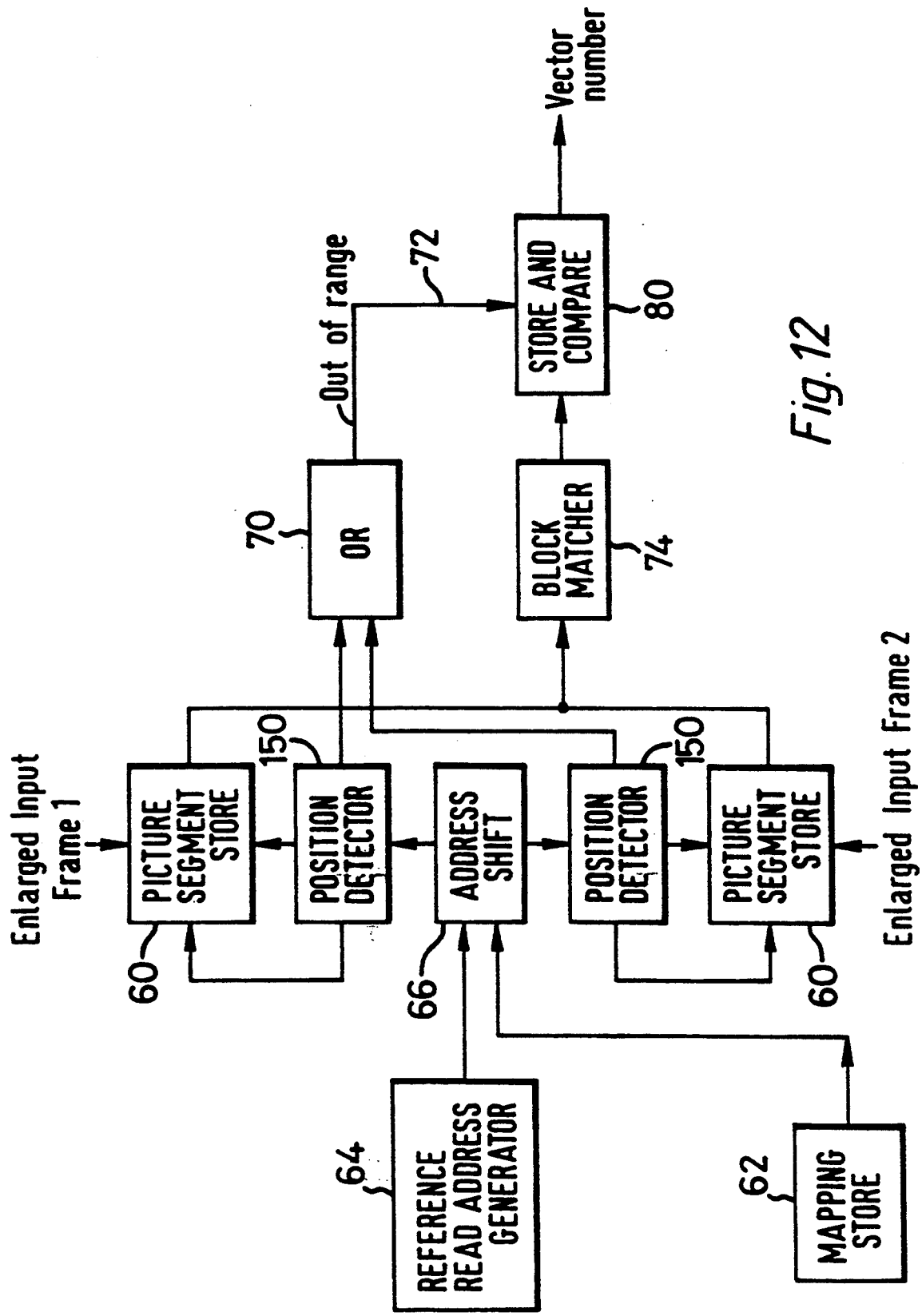
FIG. 12 is a schematic block diagram of a motion vector selector for use with the apparatus of FIG. 10.

FIG. 12 shows a motion vector selector for use with the enlarged input frames generated by the apparatus of FIG. 10. The motion vector selector in FIG. 12 is similar to that shown in FIG. 3, in that an address shifter 66 generates shifted addresses in response to an output pixel address supplied by a reference read address generator 64 and a motion vector value supplied by a mapping store 62. The shifted addresses for the input frame 1 and the input frame 2 are supplied to respective position detectors 150 which operate in a similar manner to the positions detectors 68 in FIG. 3 but only need to detect whether the pixel pointed to by the motion vector under test (i.e. the centre pixel in each test block) lies outside the extent of the input frame before enlargement. If this is the case, a signal is supplied to an OR-gate 70 which then generates an out of range signal 72 to instruct a store and compare unit 80 to discard the motion vector under test.

Assuming that the pixel pointed to by the motion vector under test is not outside its respective input frame (before enlargement) the shifted address is supplied to a respective picture segment store 60 which outputs a block of 5×5 pixels centred on the pixel pointed to by the motion vector under test to a block matcher 7q. The block matcher 74 generates a SAD value which is passed to a store and compare unit 80 as before. Using the enlarged input frames generated by the apparatus of FIG. 10 it can be guaranteed that, if the centre pixel pointed to by the motion vector under test lies within the original size of the input frame, the test block will lie entirely within the enlarged input frame. Accordingly, a full 5×5 block match can be performed and no normalisation or masking is required.

Figure 13:
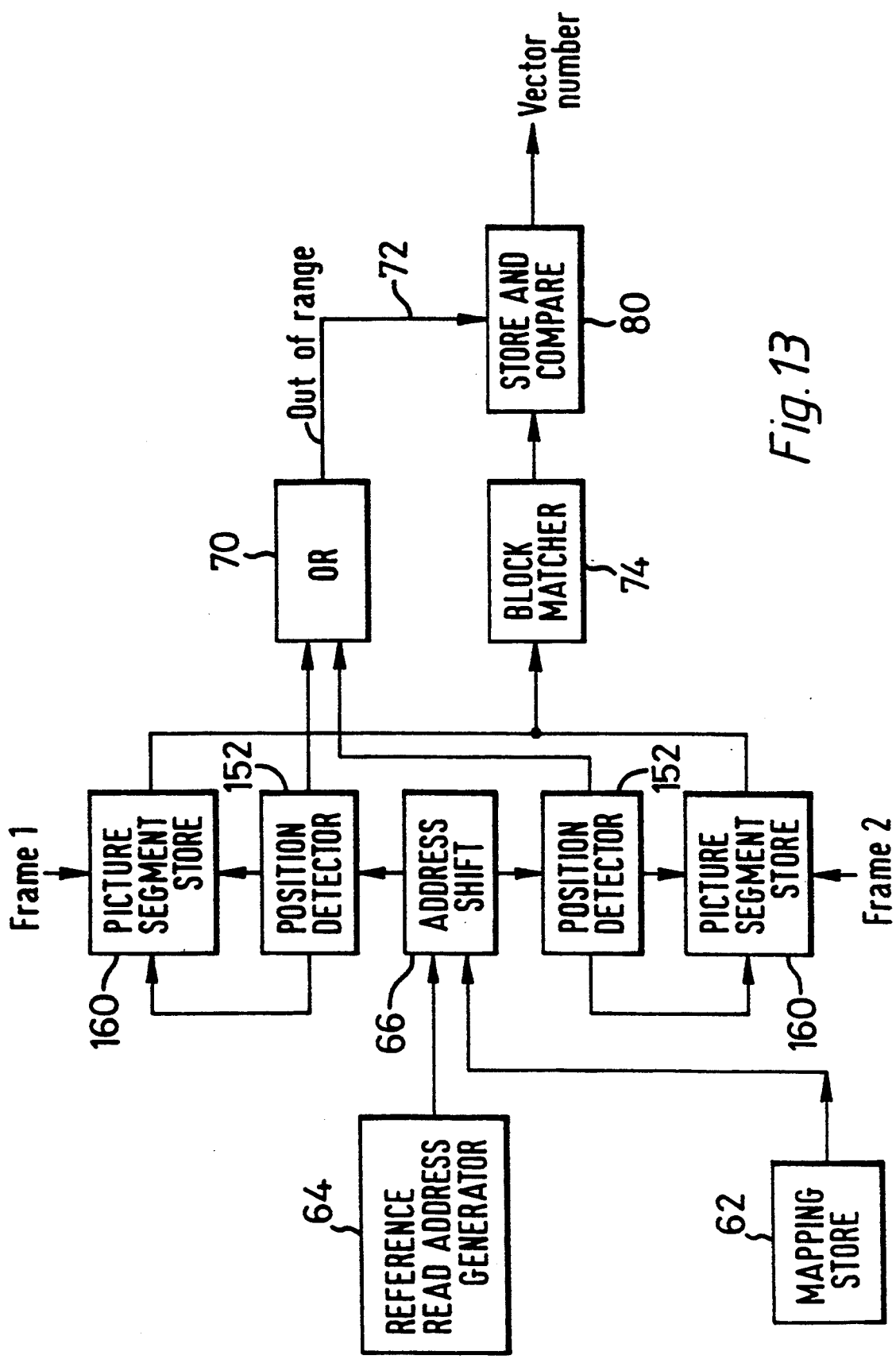
FIG. 13 is a schematic block diagram of a further embodiment of a motion vector selector.

FIG. 13 shows a further embodiment of a motion vector selector in which the same effect as the apparatus of FIG. 10 is achieved without the need to enlarge the input data before it is supplied to the motion vector selector. The basic operation of the motion vector selector shown in FIG. 13 is similar to those described above. However when the shifted address is supplied from the address shifter 66 to the position detectors 152, two checks are performed in a similar manner to the position detector 68 shown in FIG. 3. As before, a check is made to see whether the pixel pointed to by the motion vector under test lies outside the respective input frame, in which case a signal is sent to the OR-gate 70 in order that an out of range signal 72 can be generated and passed to the store and compare unit 80. Also, a check is made as to whether the pixel pointed to by the motion vector under test is at or close to the edge of the input frame. In particular, a check is made to determine whether the pixel is within one or two pixels of the edge of the frame. If this is the case a signal is sent to the respective picture segment store 160 instructing that store to generate read addresses so that pixels in rows or columns of the test block lying outside the input frame are replaced by pixels at the edge of the input frame in the same way as that shown in FIG. 11. The test blocks supplied from the two picture segment stores therefore comprise 5×5 usable pixels, so a full block match can be performed as before with no need for normalisation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of motion compensated image processing in which motion vectors are generated to represent image motion between a pair of input images from which an output image is to be derived by motion compensated interpolation, said method comprising the steps of:

generating a plurality of motion vectors for each pixel of said output image;

testing each of said plurality of motion vectors associated with a target output pixel in said output image by:

(i) determining whether respective test blocks of each of said pair of input images, pointed to by a motion vector under test, lie partially outside their respective input images;

(ii) detecting a degree of correlation between said test blocks by performing a first correlation test on parts of said test blocks lying inside their respective input images if one or both of said test blocks lies partially outside its respective input image; and (iii) detecting a degree of correlation between said test blocks by performing a second correlation test on said test blocks if both of said test blocks lie wholly inside their respective input images; and selecting, from said plurality of motion vectors, a motion vector having a highest degree of correlation between said test blocks pointed to by the selected motion vector.

2. A method according to claim 1, in which said step of performing said second correlation test comprises the steps of:

detecting absolute luminance differences between pairs of pixels at corresponding positions in said test blocks; and summing said absolute luminance differences, thereby generating a sum of absolute differences (SAD) value.

3. A method according to claim 1, in which said step of performing said first correlation test comprises the steps of:

detecting absolute luminance differences between pairs of pixels at corresponding positions in said test blocks, for which both pixels in each pair lie inside their respective input images;

summing said absolute luminance differences, thereby generating a sum of absolute differences (SAD) value; and multiplying each said SAD value thus obtained by a scale factor dependent on a ratio of a number of pixels in each of said test blocks to a number of pairs of pixels used to calculate said SAD value, 4. A method according to claim 1, in which said step of performing said first correlation test comprises the steps of:
   detecting the absolute luminance differences between pairs of pixels at corresponding positions in said test blocks;
   setting said detected absolute luminance differences to zero for pairs of pixels in which one or both of that pair lies outside its respective input image; and
   summing said absolute luminance differences, thereby generating a sum of absolute differences (SAD) value.

5. A method according to claim 1, in which said step of performing said first correlation test comprises the steps of:
   substituting pixels from said parts of each of said test blocks inside the input image into pixel positions in each of corresponding test blocks lying outside the input image;
   detecting absolute luminance differences between pairs of pixels at corresponding positions in said test blocks; and
   summing said absolute luminance differences, thereby generating a sum of absolute differences (SAD) value.

6. A method according to claim 1, in which said selecting step comprises discarding a motion vector if one or more pixels at predetermined positions in either or both of said test blocks lies outside its respective input image.

7. A method according to claim 1, in which one of said plurality of motion vectors associated with each output pixel is a motion vector representing zero inter-image motion.

8. A method according to claim 1, comprising the step of interpolating each output pixel using said motion vector selected for said target output pixel.

9. Motion compensated image processing apparatus for generating motion vectors representing image motion between a pair of input images from which an output image is to be derived by motion compensated interpolation, said apparatus comprising:
   means for generating a plurality of motion vectors for each pixel of said output image;
   means for testing each of said plurality of motion vectors associated with a target output pixel in said output image, said means for testing includes:
   (i) means for determining whether respective test blocks of each of said pair of input images, pointed to by a motion vector under test, lie partially outside their respective input images;
   (ii) means for detecting a degree of correlation between said test blocks by performing a first correlation test on parts of said test blocks lying inside their respective input images if one or both of said test blocks lies partially outside its respective input image; and
   (iii) means for detecting a degree of correlation between the test blocks by performing a second correlation test on said test blocks if both of said test blocks lie wholly inside their respective input images; and
   means for selecting, from said plurality of motion vectors, a motion vector having a highest degree of correlation between said test blocks pointed to by the selected motion vector.

10. A television standards converter comprising motion compensated image processing apparatus for generating motion vectors representing image motion between a pair of input images from which an output image is to be derived by motion compensated interpolation, said apparatus comprising:
   means for generating a plurality of motion vectors for each pixel of said output image;
   means for testing each of said plurality of motion vectors associated with a target output pixel in said output image, said means for testing includes:
   (i) means for determining whether respective test blocks of each of said pair of input images, pointed to by a motion vector under test, lie partially outside their respective input images;
   (ii) means for detecting a degree of correlation between said test blocks by performing a first correlation test on parts of said test blocks lying inside their respective input images if one or both of said test blocks lies partially outside its respective input image;
   (iii) means for detecting a degree of correlation between the test blocks by performing a second correlation test on said test blocks if both of said test blocks lie wholly inside their respective input images; and
   means for selecting, from said plurality of motion vectors, a motion vector having a highest degree of correlation between said test blocks pointed to by the selected motion vector.

* * * * *